March 29, 1932.  H. J. GAISMAN  1,851,043
BLADE PACKING AND CONTAINER
Filed Aug. 16, 1928
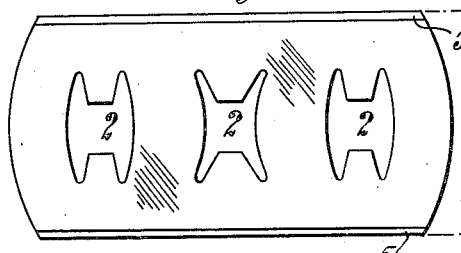
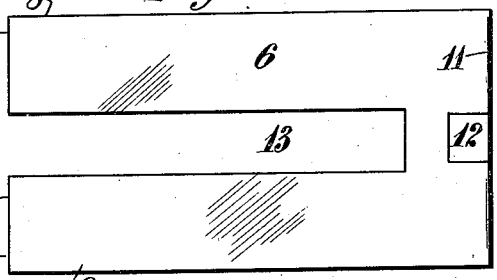
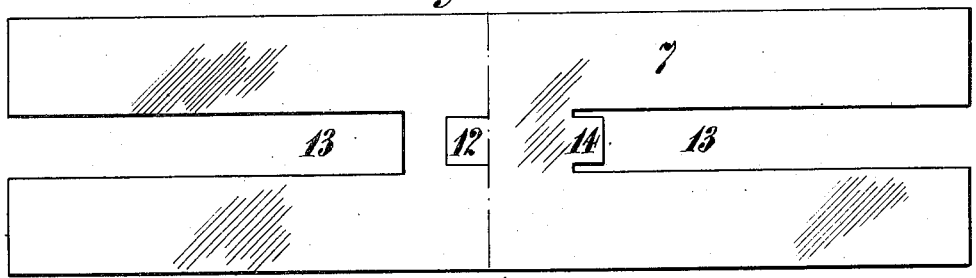
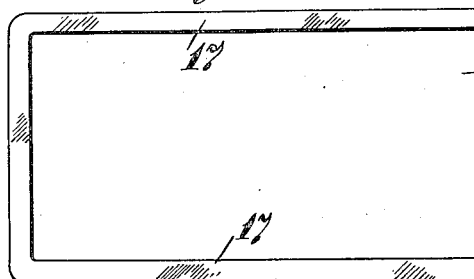
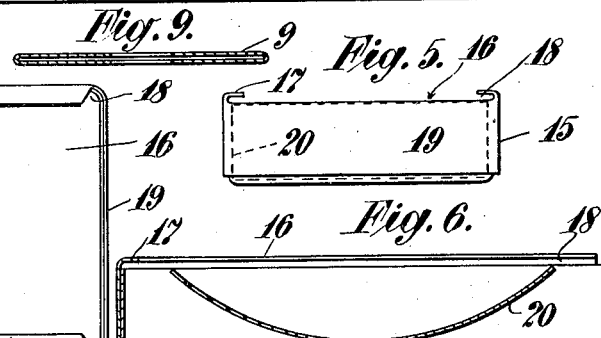
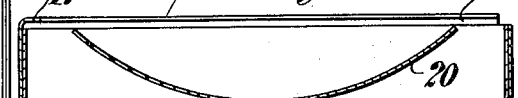
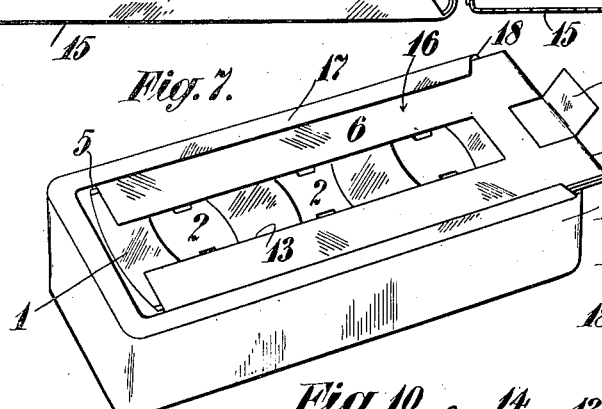
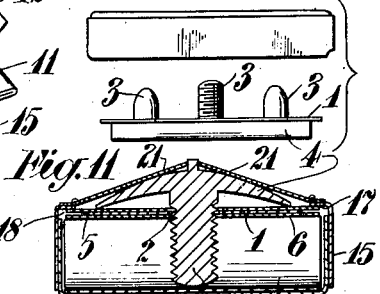

Patented Mar. 29, 1932

1,851,043

UNITED STATES PATENT OFFICE

HENRY JAQUES GAISMAN, OF NEW YORK, N. Y., ASSIGNOR, BY MESNE ASSIGNMENTS, TO GILLETTE SAFETY RAZOR COMPANY, OF BOSTON, MASSACHUSETTS, A CORPORATION OF DELAWARE

BLADE PACKING AND CONTAINER

Application filed August 16, 1928. Serial No. 300,042.

My invention relates to improvements in blade packing and container, and is particularly applicable to protectively covering safety razor blades and singly or collectively packeting these so covered in formed receptacles.

It is an object of my invention so to defend the cutting edge or edges of blades adapted to be connected to a holder that such blades are protected from injury during transit and storage.

It is also an object of my invention so to do this as to permit a blade to be connected with its holder while the blade remains within its cover and then permit the cover to be withdrawn while leaving the blade connected with its holder.

A further object of my invention is to provide for the packeting of covered blades singly or collectively in a formed receptacle or container wherein the cutting edge or edges of the blade or protected from injury, and the blade is permitted to be located on a blade holder without removing its cover, the container and cover permitting of the removal of the cover while the blade is positioned on the razor part, and the container permitting the removal of the blade therefrom while positioned on the razor portion and without damage to the cutting edge or edges.

Another object of my invention is to provide a container for a pile of blades in which the blades are held in position with their edges protected from injury and means are provided for releasing the blades one at a time for withdrawal through a delivery opening in the container, which in a more complete aspect of my invention is adapted to permit a portion of blade holding means to be properly positioned for direct transfer of a blade thereto in predetermined proper position thereon.

Another object of my invention is to permit the transfer of the blade to take place while the blade holding means, blade and container remain in fixed relationship.

Particular features of my invention are a slide-off cover or packing for the blade; a cover adapted to provide a projecting margin alongside a cutting edge to defend such edge; a cover, the continuity of which is so interrupted as to permit a blade adapted to be connected to a blade holder to be located thereon without removing the cover and to permit the cover to be withdrawn while leaving the blade connected with its holder; a formed receptacle or container permitting withdrawal flatwise of a blade and withdrawal edgewise of a cover; a container having yielding means urging a pile of blades to move to relate the blade remote from the yielding means to the withdrawing station; a container having means to overhanging projecting margins of a blade cover; a container having an opening permitting the cover of a contained blade to be withdrawn by movement of said cover in its own plane, and having a second opening of lesser width adjacent said first opening to permit an uncovered blade to pass clear therethrough; a container permitting entrance of the projections of a razor portion to connect with a blade; a container having means to definitely position a razor portion relative thereto.

My invention also comprises novel details of improvement that will be more fully hereinafter set forth and then pointed out in the claims.

Reference is to be had to the accompanying drawings, wherein:—

Fig. 1 is a plan view of a flexible razor blade having positioning holes for use in those types of safety razors in which the blade is clamped between a backing and a guard and steady pins or means of that character are provided to retain the blade and the backing from rotation on the guard.

Fig. 2 is a plan view of a packing or cover according to this invention for such a razor blade.

Fig. 3 is a plan of the blank which when doubled on itself forms the cover or wrapper shown in Fig. 2.

Fig. 4 is a plan of a blade container embodying my invention.

Fig. 5 is an end view of such blade container looking from right to left of Fig. 4.

Fig. 6 is a longitudinal section of such blade container.

Fig. 7 is a perspective view of the blade container showing a cover in the act of being withdrawn from its blade.

Fig. 8 illustrates the container from which a blade has just been transferred to a blade holding means to wit, a clamping member of a razor suited to support a blade shown in Fig. 1.

Fig. 9 shows a cross section of a sheath-like form of the cover according to Fig. 2.

Fig. 10 shows a modification of the cover.

Fig. 11 shows a modification of the container.

Similar numerals of reference indicate corresponding parts in the several views.

The blade 1 has positioning openings 2 adapted to co-operate with the pins 3 of a blade holding means 4 when such blade is clamped between such member 4 and a guard in well known manner.

The blade 1 is also adapted to co-operate with special projections on a backing and guard respectively of another type of razor not here shown.

As a cover for such blade 1 adapted to protect the cutting edges 5 thereof from injury during transit and storage, and until the blade is transferred to a razor part, I provide a cover 6 which consists of a blank 7 doubled on itself and formed, as can be seen by comparing Figs. 1 and 2, of such a width that projecting margins 8 are provided alongside said cutting edges 5 to defend such edges when the blade 1 is placed medially between the folds of the cover 6.

The cover 6 may be conveniently formed of grease-proof material, and the blade 1 will be suitably treated with protective layers of grease or other rust preventing material which will tend to preserve the proper symmetrical positioning of the cover 6 over the blade 1.

The cover 6 may be either open along three adjacent edges, or it may be formed as a bag or sheath 9, Fig. 9, with a single open end 10.

For facilitating the removal of the cover from the blade, the cover 6 may be provided at the folded end 11 with a finger tab 12 which may be formed by appropriately slitting the blank as shown in Fig. 3. In this way the cover 6 may be withdrawn from the blade 1 by relative sliding movement of said cover and said blade.

In order to permit the blade to be connected with projections from blade holding means, and then to permit the cover 6 to be withdrawn while leaving the blade 1 connected with its holder 4, the cover 6 is provided in both folds with co-incident slots 13 which extend from the open end of the cover sufficiently towards the folded end 11 thereof to expose the positioning holes 2 of the blade 1 and to permit the sliding withdrawal of the cover 6 while leaving the blade 1 connected with its holder 4.

The opposite face of the cover 6 to that having the finger tab 12 may be provided with an oppositely folded edge 14 whereby to cause, in the case of a pile of covered blades, the tab 12 of the subjacent blade cover to be unfolded ready for use by the action of the folded edge 14 of the superjacent blade cover during its withdrawal.

As a formed receptacle or container for singly or collectively packeting razor blades so covered, I provide a blade container consisting of a box 15 having an open top 16 provided with overhanging long edges 17 whereby to co-operate with the projecting margins 8 of the cover 6 of a blade 1 to prevent such covered blade from flatwise withdrawal through said open top 16.

Adjacent said opening 16 a wider opening 18 is formed in an end wall 19 of the box 15 whereby to permit a cover of a blade registering with such opening 18 to be withdrawn edgewise therethrough by movement of the cover in its own plane.

The cover in the act of such withdrawal is shown in Fig. 7 from which it wil be seen that the cover 6 and the container 15 permit the blade 1, while remaining within its cover, to be located with reference to and to receive projections 3 from a blade holder 4 and that the cover permits itself to be withdrawn while leaving the blade connected with the holder.

Thus the container is provided with means for releasing one blade at a time and the container permits the portion of blade holding means 4 to be properly positioned for direct transfer of a blade thereto in predetermined proper position thereon while said holder, blade and container remain in fixed relationship.

The projecting margins 8 of the cover 6 which range alongside of the cutting edges of the blade serve to prevent the blade edges from coming into contact with the wall of the container.

For a pile of blades the container has a depth suited thereto, and should be provided with yielding means such as a blade spring 20, for urging the pile to move to relate the blade remote from the yielding means to the withdrawing station.

In Fig. 11 is shown how a portion of blade holding means may be provided with a positioning rib or fillet whereby to definitely position said razor portion relative to the container 15 by a co-operating pair of folding lids 21.

The open end of the cover may be provided with an end closing fold extension 22 which may be gapped in line with the slots 13, or made continuous and adapted to be broken in the act of withdrawing the cover 6 from the blade within it.

Use may be made of such a fold extension 22, whether gapped or made continuous, to unfold the tab 12 of the cover of a subjacent blade as the upper cover is withdrawn.

If the fold extension is gapped in the line of the slots 13, the tab 12 may be extended in the direction of its width to bring it within the action of the gapped fold.

It is to be understood that the invention is equally applicable to blades having single cutting edges and also to other blade holding means by which a blade is located on a blade-holder by co-operating projections on one part and openings on the other part.

It is to be noted that by suitably proportioning the width of the slots 13 with respect to the width of the openings 2 in the blade 1 that while the blade holding means are connected to the blade while this is in the container and while the blade remains within the cover, the projections from the blade holder are restrained by the cover from movement tending to contact the cutting edge with the wall of the container.

Having now described my invention, what I claim is:—

1. For a pile of razor blades, a protective cover for the opposite sides of each said blade, said cover being open along an edge to permit the cover to be withdrawn from said blade by sliding said cover in its own plane in a direction substantially normal to said open edge, a finger tab projecting from one face of said cover and a tab projecting in opposite direction from the other face of said cover whereby to cause the tab of the subjacent blade cover to be unfolded ready for use when a superjacent cover is withdrawn.

2. For a razor blade having a slide-off cover thereon, a blade container having an opening permitting the passage flatwise of the blade only when the blade cover is withdrawn and having an opening permitting withdrawal therethrough of the cover by an extracting movement thereof in its own plane.

3. For a pile of razor blades, each having a slide-off cover thereon, said cover having projecting margins along a cutting edge and an opposite edge of said blade, a blade container having yielding means urging the pile towards the boundary of an opening permitting the passage flatwise of a blade only when its blade cover is withdrawn, and having an opening permitting withdrawal therethrough of said cover by an extracting movement thereof in its own plane.

4. For a pile of razor blades, each having a slide-off cover thereon provided with a longitudinal slot, a blade container having yielding means urging the pile to one side of said container, and having an opening whereby to permit only one cover at a time to be removed.

5. In combination, a blade container for a pile of blades, means to hold the blades in position within the container with their edges protected against injurious contacting relationship with any object within reason, said container having an unobstructed opening permitting flatwise withdrawal of the blades, means for releasing one blade at a time for passage through said opening, said container opening being adapted to permit a portion of blade holding means to be properly positioned opposite a blade for direct transfer of a blade thereto in predetermined proper position thereon.

6. A blade container as claimed in claim 5 in combination with blades having openings therein whereby to permit projections from a portion of blade holding means to enter said openings through the container opening and permit the transfer of the blade to take place while said holder, blade and container remain in fixed relationship.

7. A blade container as claimed in claim 5 in combination with a protective cover for each blade whereby to prevent contact of the cutting edges with the wall of said container, said cover having an opening permitting its blade to connect with said portion of blade holding means while the blade remains within the cover and permitting the cover to be withdrawn from the blade while the blade remains connected with said portion of blade holding means.

8. A blade container as claimed in claim 5 in combination with yielding means urging the pile to move to relate the blade remote from the yielding means to the withdrawing station.

9. A blade container having an opening permitting extraction in its own plane of a cover of that blade which is at the withdrawing station, and an opening permitting withdrawal flatwise of said blade after the cover is removed from the blade.

10. A container to hold a plurality of blades each protected by a cover the edges of which prevent the blade edge from coming in contact with the container, means to allow the projections of a razor portion to enter said container, means to allow the projections to enter the cover of a blade and the cover to be removed while the blade is positioned on razor portion, and means to allow the blade to be removed from container while positioned on razor portion without damage to the blade edge.

11. A covered-blade container having an opening adapted to permit the cover of a contained blade to be withdrawn by movement of said cover in its own plane, and having a second opening of lesser width adjacent said first opening to permit said blade only when uncovered to pass flatwise therethrough.

12. A container for a blade having positioning openings therein, said container adapted to permit a portion of blade holding means to connect with said blade while within said container, and means on the container to definitely position said portion of blade holding means relative to said container.

13. A container for a blade, said blade having positioning openings therein, a slide-off cover on said blade having a projecting margin to protect a cutting edge of the blade from contacting with the wall of said container, said cover having a medial slot so proportioned in width with respect to the width of the positioning openings in the blade that projections from blade holding means are received by the blade while this is in the container and while the blade remains within the cover.

In testimony whereof, I affix my signature.
HENRY JAQUES GAISMAN.